United States Patent [19]

Sato et al.

[11] 4,119,213

[45] Oct. 10, 1978

[54] TOOL STORAGE MAGAZINE DEVICES

[75] Inventors: Mituharu Sato; Seiji Nakajima, both of Numazu, Japan

[73] Assignee: Toshiba Kikai Kabushiki Kaisha, Tokyo, Japan

[21] Appl. No.: 837,588

[22] Filed: Sep. 28, 1977

[30] Foreign Application Priority Data

Sep. 29, 1976 [JP] Japan ............................. 51-117008

[51] Int. Cl.² ............................................. B23Q 3/157
[52] U.S. Cl. ............................. 214/1 BB; 214/1 BC; 214/1 BD; 29/568
[58] Field of Search ............... 214/1 BB, 1 BC, 1 BD, 214/147 T; 29/568

[56] References Cited

U.S. PATENT DOCUMENTS 3,300,856   1/1967   Daugherty ............................. 29/568

*Primary Examiner*—Gil Weidenfeld
*Attorney, Agent, or Firm*—Koda and Androlia

[57] ABSTRACT

There are provided a pair of concentric inner and outer annular magazines each provided with a plurality of tool pots and a blind pot which are arranged along a circle, and magazine driving device for independently rotating the outer and inner magazines to bring a tool pot containing a designated or the blind pot to predetermined tool pot indexing positions, and a tool holding pot disposed on the outside of the outer annular magazine for temporarily holding a tool taken out from one of the tool pots of the inner or outer magazine or a tool returned from a machine tool. The center of the holding pot lies on a line interconnecting the center of the inner and outer magazines and the tool pot indexing positions thereof. A saddle including a tool transfer arm with a tool gripper is moved along the line for inserting and taking out a tool into and out of a designated tool pot, and a tool exchanging mechanism is used to exchange a tool between the tool holding pot and the machine tool.

5 Claims, 8 Drawing Figures

1

TOOL STORAGE MAGAZINE DEVICES

BACKGROUND OF THE INVENTION

This invention relates to a tool storage magazine of an automatically tool changing type machine tool, more particularly a tool storage magazine device including a plurality of concentric rotary annular disc type magazines for increasing the capacity of storing tools.

Tool storage magazines are classified into shelf type, chain type, disc type, etc., according to their configuration, but in most cases, disc type magazines are now used. In the shelf type, control for take out and return of the tool is complicated, whereas in the chain type there is a defect that the pitch of the tool pots adapted to contain tools is large. In contrast, the disc type is advantageous in that its construction is simple. However, this type is advantageous so long as the number of the tools to be stored is relatively small, for example from 16 to 30, but when the number of tools increases beyond 30, the diameter of the disc becomes excessive. Certain types of machine tools require tool storage magazines having a capacity of 60 or more tools.

SUMMARY OF THE INVENTION

Accordingly it is an object of this invention to provide an improved rotary disc type tool storage magazine device having relatively small and compact size but capable of storing a large number of tools.

Another object of this invention is to provide a novel tool storage magazine device capable of storing a larger number of tools than prior art tool storage devices and capable of taking out a designated tool and storing used tool in a predetermined tool pot.

Briefly stated, in accordance with this invention there is provided a tool storage magazine device comprising concentric inner and outer magazines, each provided with a plurality of tool pots and a blind pot which are arranged on a circle, magazine driving means for independently rotating the inner and outer annular magazines to bring a tool pot containing a designated tool or the blind pot to predetermined tool pot indexing positions, a tool holding pot disposed on the outside of the outer annular magazine for temporarily holding a tool, the tool holding pot having a center on a line interconnecting the center of the inner and outer annular magazines and the tool pot indexing positions thereof, a saddle located near the center and supported to be movable in a direction perpendicular to the axis of the magazines, a tool transfer arm supported by the saddle to be movable along the line interconnecting the tool pot indexing positions, said tool transfer arm including a gripper for gripping a tool and means for selectively positioning the gripper to a retracted position inside of the inner magazine, the tool indexing positions of the inner and outer annular magazines and to the position of the tool holding pot.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
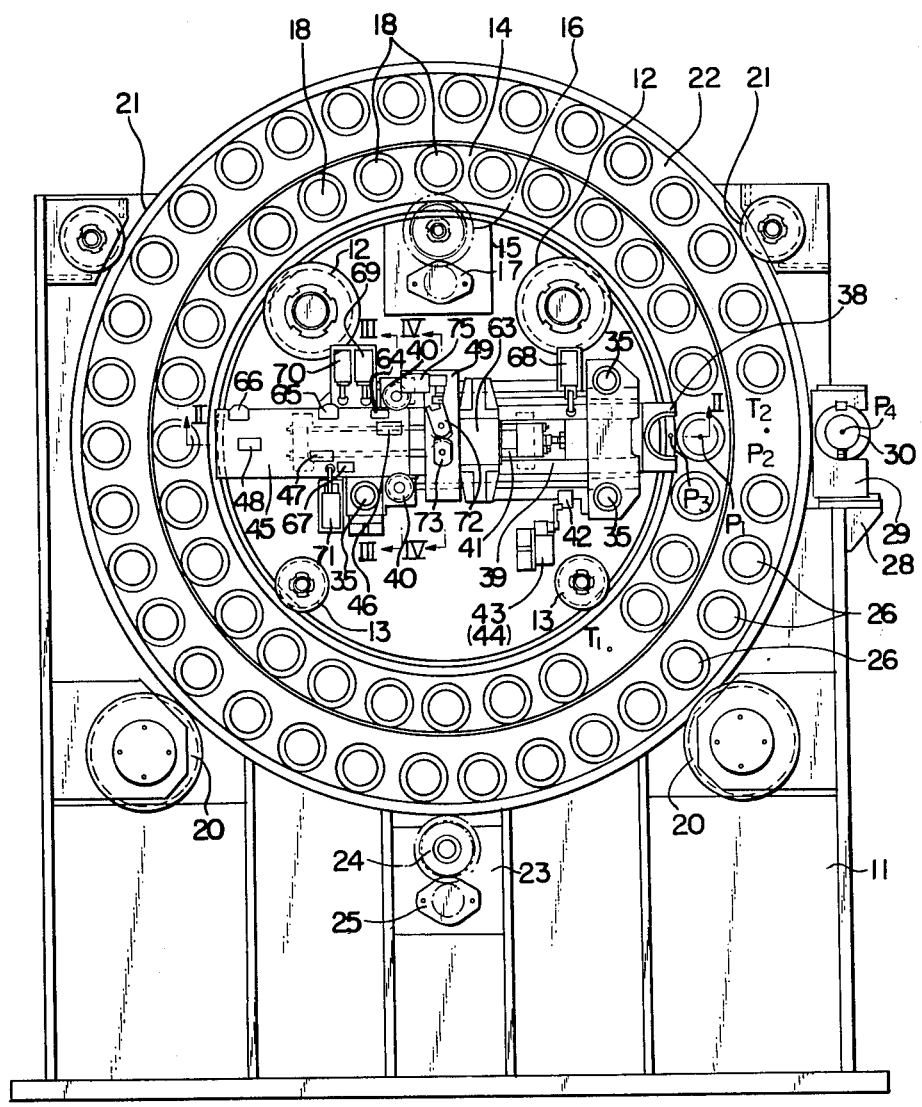
FIG. 1 is a plan view showing a tool storage magazine device embodying the invention.

The tool storage magazine device shown in FIGS. 1 through 4 of the accompanying drawings comprises two pairs of rollers 12 and 13 rotatably mounted on columns 11 supported on a foundation, an inner annular magazine 14 rotatably supported by rollers 12 and 13 at its inner periphery, and an inner magazine driving device 15 which is secured to the column 11 on the inside of the magazine 14 and including a pinion 16 adapted to mate an inner gear, not shown, on the inner periphery of the magazine and an oil pressure motor 17 for driving the pinion 16. The inner magazine 14 is provided with a plurality of tool pots 18 which are disposed at an equal pitch along a circle having a center at the center of the annular inner magazine 14. The axes of respective tool pots 18 are perpendicular to the plane of rotation of the inner magazine 14, and distributed uniformly along the circle except one vacant position $T_1$ which hereinafter called a "blind tool pot." Accordingly, as the inner magazine 14 is rotated by the driving device 15, a tool pot 18 containing a designated tool or the blind tool pot $T_1$ is indexed to a tool pot indexing position $P_1$ at the cross point between a horizontal line passing through the center of rotation and a circle along which the tool pots are distributed.

The tool storage magazine device further comprises two pairs of rollers 20 and 21 rotatably supported by columns 11 for rotatably supporting an outer annular magazine 22 concentric with the inner magazine 14 and an outer magazine driving device 23 secured to the column 11 on the outside of the outer magazine 23 and including a pinion 24 adapted to drive a gear, not shown, on the outer periphery of the outer magazine 23 and an oil pressure motor 25 for driving pinion 24. A plurality of tool pots 26 are mounted on the outer magazine at an equal pitch along a concentric circle except a blind tool pot $T_2$. Respective tool pots 26 are disposed at right angles with respect to the rotary plane of the outer magazine. Consequently, when the outer magazine is rotated by the driving device 23, a tool pot 26 containing a designated tool or the blind tool pot $T_2$ is brought to a tool indexing position $P_2$ at the cross-point between the horizontal line passing through the center of rotation and the circle on which the tool pots 26 are distributed. The tool pots 18 and 26 of the inner and outer magazines 14 and 22 are assigned with identification codes and a reader, not shown, for reading the indentification codes is mounted on the column 11 so that tool pots 18 and 26 containing designated tools or blind tool pots $T_1$ and $T_2$ can be brought to the tool pot indexing positions $P_1$ and $P_2$. As the method of and apparatus for indexing tool pots are well known in the art, it is believed unnecessary to describe them herein.

A tool reservation or holding pot 30 is secured to the column 11 by a bracket 28 and a holder 29 on the outside of the outer magazine 22. The axis of a tool holding pot 30 lies on said horizontal line and extends in parallel with the axes of the tool pots 18 and 26. The tool holding pot 30 is used to temporarily hold a tool returned from the spindle of a machine tool, not shown, or a tool taken out from the inner or outer magazine and to be used next time.

Figure 2:
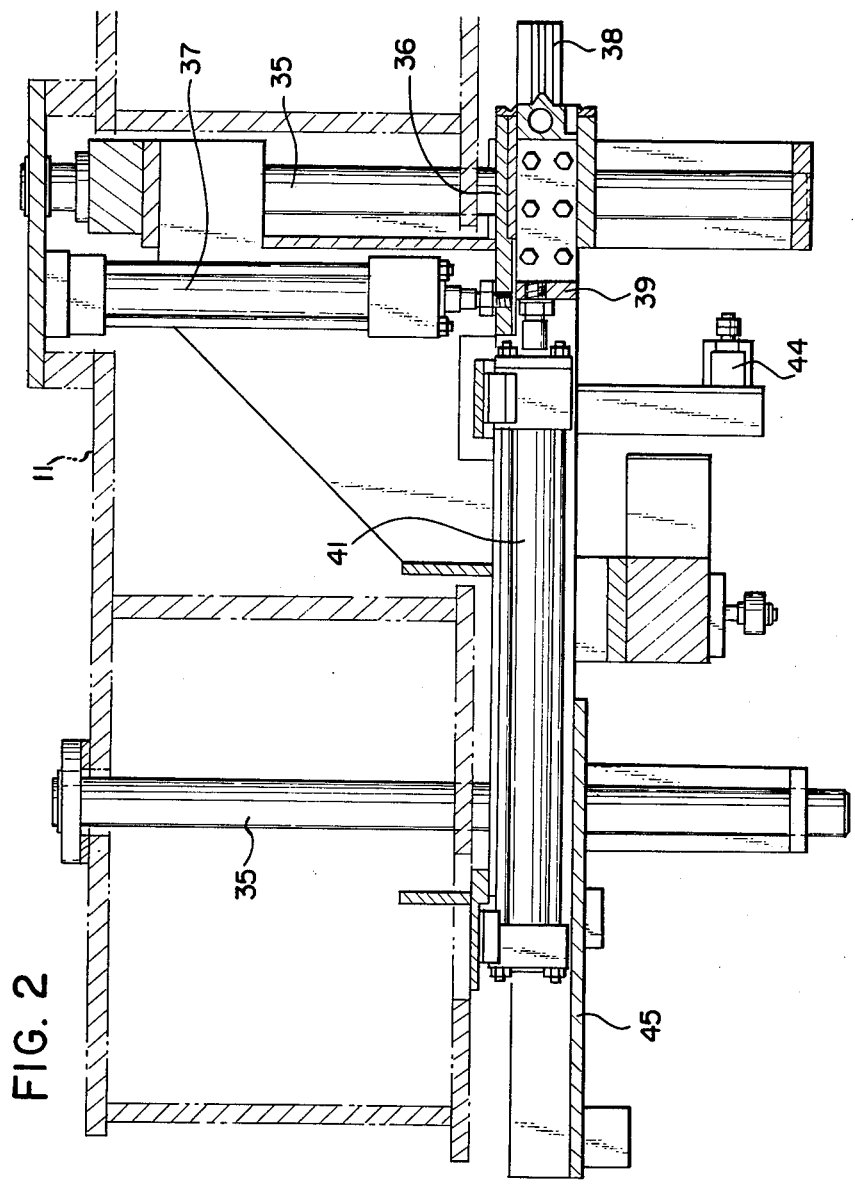
FIG. 2 is an enlarged sectional view taken along a line II—II shown in FIG. 1.
Figure 3:
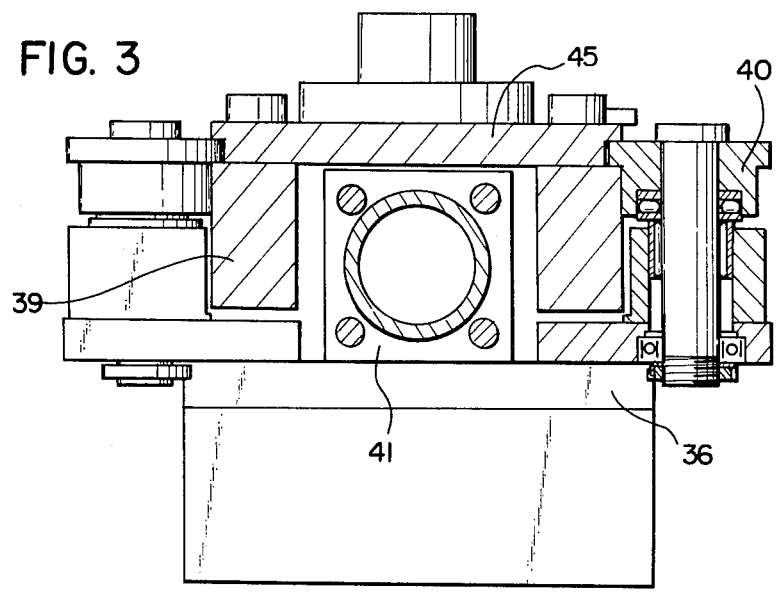
FIG. 3 is an enlarged sectional view taken along a line III—III shown in FIG. 1.

A tool transfer mechanism is used for transferring the tool between a tool pot of the inner or outer magazine and the holding pot 30. As shown in FIGS. 1 and 2, this mechanism comprises guide bars 35 secured to column 11 and extending in the direction perpendicular to the sheet of FIG. 1, that is in the direction parallel to the axes of the tool pots of the inner and outer magazines, a saddle 36 mounted on the guide bars 35 through bearings to be movable therealong and a piston-cylinder assembly 37 with its cylinder secured to the column 11 and the piston rod connected to the saddle 36.

Accordingly, when the piston-cylinder assembly 37 is operated the saddle 36 is moved along guide bars 35 in parallel with the axes of the tool pots of the inner and outer magazines 14 and 22. A dog 42 is mounted on the saddle 36 for operating limit switches 43 and 44 (in FIG. 1 the latter is not seen) which are used to detect the advanced and retracted positions of the saddle. As shown in FIGS. 1 and 2, there are also provided a tool gripper 38 mounted on the saddle, tool transfer arms 39 secured to the gripper 38 with their one ends slidably supported by the saddle 36 and the other ends supported by rollers 40 which are rotatably supported by the saddle 36, and a piston cylinder assembly 41 secured to the saddle and having a piston rod connected to the gripper 38. Accordingly, when the piston cylinder assembly 41 is operated, the tool transfer arms 39 are guided by the saddle 36 and rollers 40 to reciprocate in the horizontal direction as viewed in FIG. 1. The tool transfer arms 39 are supported by the saddle 36, and rollers 40 are rotatably supported thereby such that the center of the gripper will be moved along a line passing through the tool pot indexing positions $P_1$ and $P_2$.

Figure 4:
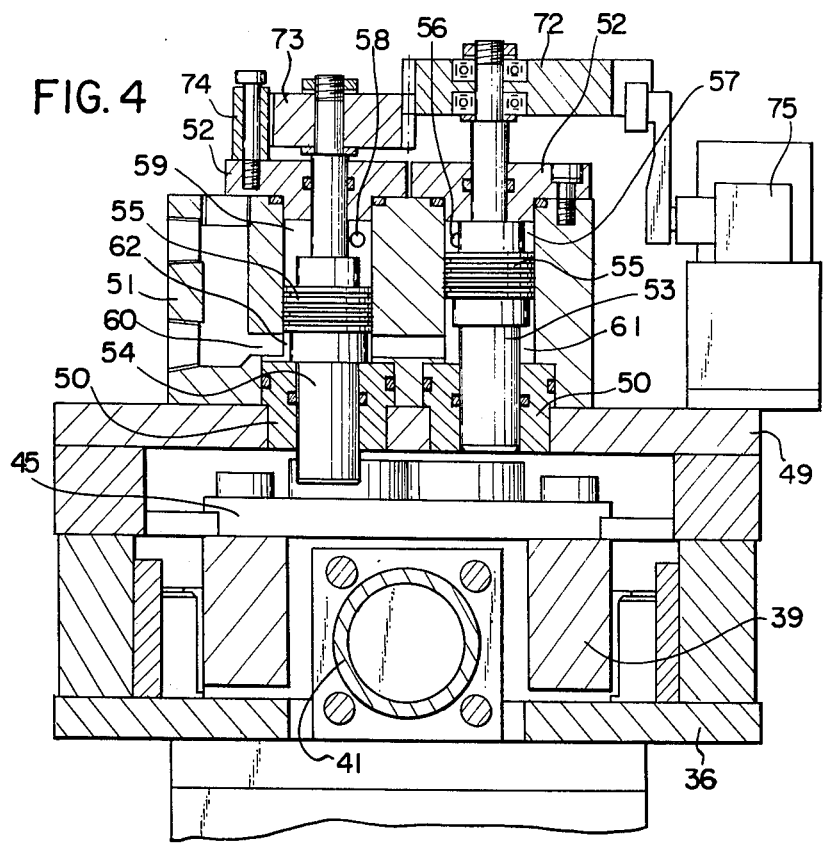
FIG. 4 is an enlarged sectional view taken along a line IV—IV shown in FIG. 1.

A mechanism is provided for indexing the center of the gripper 38 to either one of the retracted position $P_3$ shown in FIG. 1, the tool pot indexing position $P_1$ of the inner magazine 14, the tool pot indexing position $P_2$ of the outer magazine 22 and the center $P_4$ of the holding pot 30. As shown in FIGS. 1 and 4, this indexing mechanism comprises a dog plate 45 secured to the rear ends of the tool transfer arms 39, stops 46, 47 and 48 secured to the dog plate, a pedestal 49 secured to the saddle, flanged bushings 50 fitted in the openings of the pedestal, a distributing cylinder 51 fitted on the flanges of the bushings and provided with two bores coaxial with the openings of the two bushings, the distributing cylinder 51 being secured to the upper surface of the pedestal 49, cylinder heads 52 secured to the upper end of the distributing cylinder 51 and having two bosses fitted in the cylinder bores, and stop shafts 53 and 54 having rods extending through the openings of the cylinder heads 52 and the bushings and pistons 55 fitted in the bores of the distributing cylinder 51. Pressurized oil is supplied to the upper chambers 57 and 59 of the distributing cylinder 51 through openings 56 and 58 respectively and to the lower chambers 61 and 62 through an opening 60. Thus, the stop shafts 53 and 54 are moved in the vertical direction by the supply of pressurized oil into the upper and lower chambers. Accordingly, when the stop shaft 53 is raised the stop member 46 can pass beneath the stop shaft 53 but would be arrested when the stop shaft 53 is lowered, thus stopping the movement of the tool transfer arms 39 thereby positioning the center of the gripper 38 at the tool pot indexing position $P_1$. In the same manner, when the stop member 47 is locked by the descending of stop shaft 54, the center of gripper 38 is positioned at the tool pot indexing position $P_2$.

The height of stop member 48 is larger than those of other stop members 46 and 47 so that when it is engaged by the pedestal 49, the center of the gripper 38 would be positioned at the center of the holding pot 30. The vertical movements of stop shafts 53 and 54 are controlled by switching the direction of the pressurized oil supplied to chambers 57, 59, 61 and 62, such switching being effected by an electromagnetic transfer valve, not shown, secured to the distribution cylinder 51.

Dogs 64 through 67 are secured to dog plate 45 and a limit switch 68 is provided to be operated by dog 64 for detecting the fact that the gripper 38 has been positioned at the center $P_4$ of the holding pot 30. There are also provided a limit switch 69 operated by dog 65 for detecting the fact that the center of the gripper 38 has been positioned to the tool pot indexing position $P_2$, a limit switch 70 operated by dog 66 for detecting the fact that the gripper 38 has been positioned to the tool pot indexing position $P_1$, and a limit switch 71 operated by dog 67 for detecting the fact that the gripper 38 has been positioned to the retracted position $P_3$.

The mechanism for detecting the position of stop shafts 53 and 34 are constructed as follows. A segment gear 72 formed with helical gear teeth is rotatably mounted on the upper end of stop shaft 53 and a segment gear 73 formed with helical gear teeth meshing the helical gear of segment gear 72 is mounted on the stop shaft 54. There are provided a stop member 74 secured to the upper surface of the cylinder cover 52 and fitted in a slot of the segment gear 73, and a limit switch 75 mounted on the upper surface of pedestal 49 having an operating member extending into a groove of the segment gear 72. Accordingly, when the stop shafts 53 and 54 are held at the same level, the segment gear 72 is indexed to a neutral position thereby turning OFF the limit switch 75, whereas when either one of the stop shafts is moved the segment gear 72 is rotated by the action of the helical gears, thus turning ON the limit switch 75.

The operation of the tool storage magazine device of this invention is as follows. When the tool number or code of a tool to be mounted on the spindle of a machine tool is instructed by a digital control device, whether the tool is contained in a tool pot 18 of the inner magazine 14 or in a tool pot 26 of the outer magazine 22 is judged in accordance with the tool member. If it is judged that the designated tool is contained in the inner magazine 14, it is rotated by its driving means whereby the tool pot 18 containing the designated tool is indexed to the tool pot indexing position $P_1$. At the same time, the driving means 23 for rotating the outer magazine 22 is also operated thereby indexing its blind tool pot $T_2$ to the tool pot indexing position $P_2$ by the identifying device. At this time, saddle 36 is moved to the retracted position, and the gripper 38 of tool transfer arms 39 is also moved to the retracted position $P_3$. Since it has been determined that the designated tool is contained in the inner magazine, stop shaft 53 is lowered and pressurized oil is admitted into the head side of the piston-cylinder assembly 41 to advance the tool transfer arms 39 which are stopped when stop member 46 engages stop shaft 53 thereby positioning gripper 38 to the tool pot indexing position $P_1$. Accordingly, the gripper 38 can grip the tool contained in tool pot 18 indexed to the position $P_1$. As pressurized oil is admitted into the head side of the piston-cylinder assembly 37, saddle 36 is moved in parallel with the axis of the tool pot 18 so that the designated tool is withdrawn from the tool pot by the gripper 38 of the tool transfer arms 39.

Then, the stop shaft 53 is raised to permit the tool transfer arms 39 to advance. Since pressurized oil has been admitted into the head side of the piston-cylinder assembly 37 the tool transfer arms 39 advance until stop member 48 engages the pedestal 49.

As a consequence, the gripper 38 is positioned at the center $P_4$ of the holding pot 30. At this time, when the pressurized oil is admitted into the rod side of the piston-cylinder assembly 37, saddle 36 is retracted and a tool held by the gripper is inserted into the holding pot 30. When the pressurized oil is admitted into the rod side of the piston-cylinder assembly 41, the tool transfer arms 39 are retracted so that the tool that has been held by the gripper 38 is returned to the holding pot 30 and the gripper is returned to the retracted position $P_3$, thus preparing for the exchange of the tool between the holding pot and the spindle of the machine tool.

Then, it is determined that whether a tool pot to which a tool used by the machine tool is to be returned belongs to the inner magazine 14 or the outer magazine 22. When it is determined that the tool pot belongs to the outer magazine 22, it is rotated by driving means 23 and the tool pot into which the used tool is to be returned is indexed to the tool pot indexing position $P_2$. At the same time, the inner magazine 14 is rotated by the driving means 15 to index the blind tool pot $T_1$ to the tool indexing position $P_1$. When the tool that has been used by the machine tool is put into the holding pot 30 by a tool exchange mechanism to be described later the pressurized oil is admitted into the head side of the piston-cylinder assembly 41 so that the tool transfer arms 39 are advanced until stop member 48 engages the pedestal 49, thus positioning the gripper 38 to the center $P_4$ of the holding pot 30. Consequently, the gripper 38 grips the tool contained in the holding pot 30. Then, pressurized oil is admitted into the head side of the piston-cylinder assembly 37 to advance saddle 31 thus withdrawing the tool from the holding pot 30. Then the pressurized oil is supplied to the rod side of the piston-cylinder assembly 41 for moving the tool transfer arm 39 to the retracted position $P_3$. Since it has been determined that the used tool is to be returned to a tool pot 26 of the outer magazine 22, stop shaft 54 is lowered while the stop shaft 53 is held in the raised position. Then pressurized oil is admitted into the head side of the piston-cylinder assembly 41 to advance the tool transfer arms 39 until stop member 47 is arrested by stop shaft 54, thus stopping the tool transfer arms 39. As a consequence, the gripper 38 is positioned at the tool pot indexing position $P_2$ so that when saddle 36 is retracted by operating the piston cylinder asssmbly 37 in the opposite direction the tool held by the gripper 38 will be inserted in tool pot 26 of the outer magazine 22. As the tool transfer arms 39 are retracted by operating the piston cylinder assembly 41 the gripper 38 retracts by leaving the tool in the tool pot 26 and then stops thus positioning the gripper 38 at the retracted position $P_3$.

As above described, a designated tool is selected from the inner or outer magazine and transported to the holding pot, and a tool returned to the holding pot is returned to a predetermined tool pot of the inner or outer tool pot.

As above described, according to this invention since two annular tool storage magazines are arranged concentrically and driven independently for indexing tool pots to predetermined indexing positions it is possible to store a large number of tools without increasing the space occupied by the storage magazine device. In one example of this invention it is possible to store 60 tools in a magazine device having a diameter of 1.5 meter. Moreover, as the tool pot indexing positions are selected at the cross points between a horizontal line passing through the center of rotation of the magazines and circles of respective magazines along which tool pots are arranged, it is possible to readily bring tools held by a gripper to the indexing positions by moving the gripper in parallel with the horizontal line. Further, the tools are inserted and withdrawn into and out of the tool pots by moving the gripper in the axial direction of the pots. In addition it is possible to readily transfer the tools between the tool pots and a holding pot by simple tool transfer mechanism. As each magazine contains about one half of the total tools, it is possible to index tools in a time shorter than conventional chain type magazine.

The mechanism for exchanging tools between the tool storage magazine device of this invention and a machine tool is constructed as follows. The column 111 of the machine tool is provided with a rotatable spindle 112 on which a tool is to be mounted. As above described, a tool selected from a plurality of tools contained in the tool storage magazine device 113 of this invention is transferred to a holding pot 116 at an intermediate station by a tool transfer arm 114.

Figure 5:
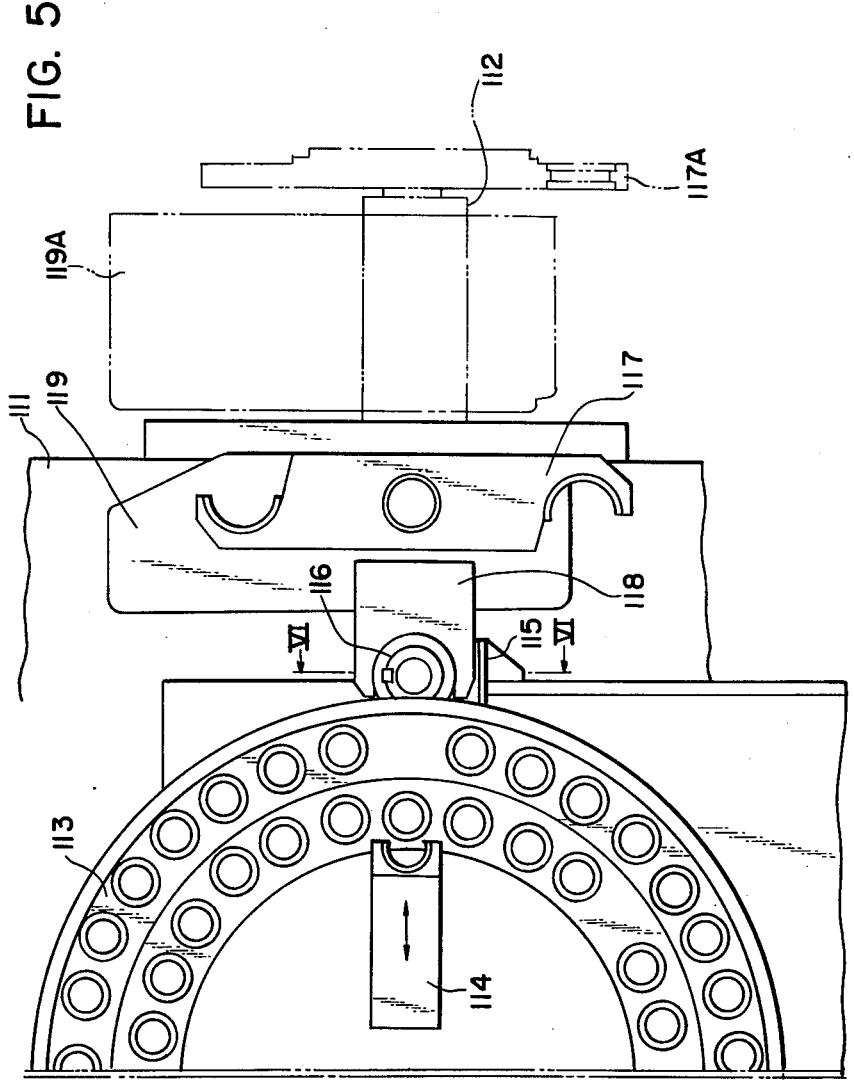
FIG. 5 is a diagrammatic side view showing the relative position among the tool storage magazine device of this invention, a tool exchanging mechanism, and the spindle of a machine tool.

A tool exchange arm 117 is rotatably supported near the intermediate station 115 and a swing arm 119 including pawls 118 is provided to rotate 90° between the solid line position and the dotted line position 119A shown in FIG. 5. The holding pot 116 is transferred to the swing arm 119, and the axis of the holding pot 116, that is the axis of the tool contained therein is aligned with the axis of spindle 112 by rotating the swing arm 119. 117A shows the position of the tool exchange arm 117 after rotation of 90°.

Figure 6:
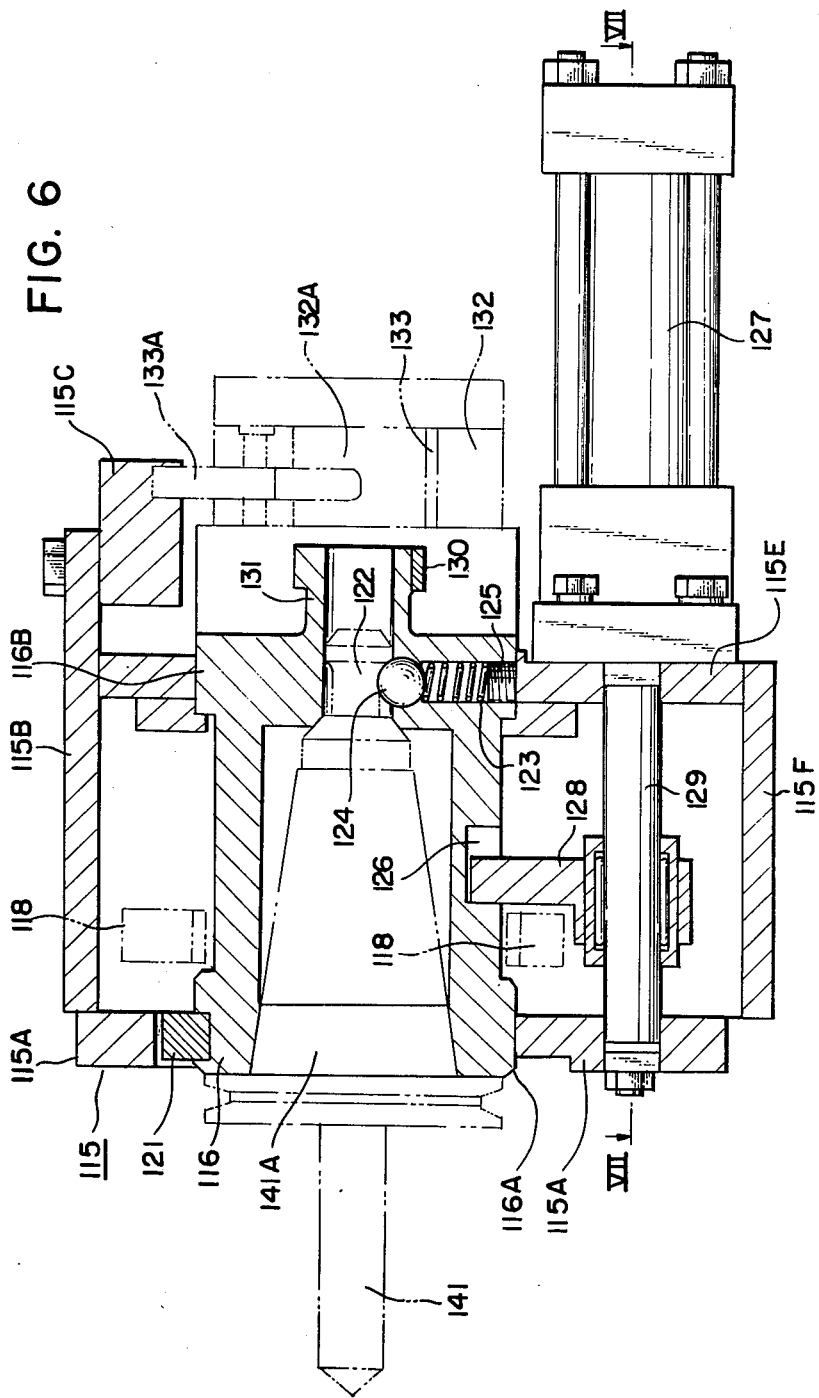
FIG. 6 is an enlarged sectional view taken along a line VI—VI in FIG. 5.
Figure 7:
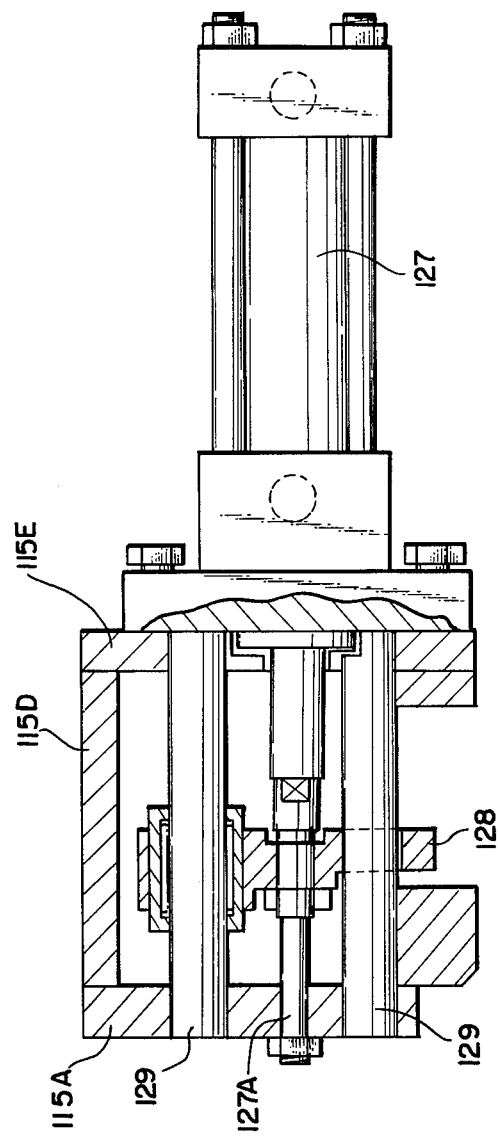
FIG. 7 is a sectional view taken along a line VII—VII in FIG. 6.

FIG. 6 shows an initial state in which the holding pot 116 is engaging intermediate station 115 which comprises frames 115A through 115F (frame 115D is shown in FIG. 7). The tool holding pot 116 is supported by the intermediate station with its flanges 116A and 116B supported by frames 115A and 115E respectively, and held against rotation by a key 121.

A tool 141 transferred to the holding pot 116 by the tool transfer arm 114 is provided with a drum shaped projection 122 at its rear end. A ball 124 is urged against the reduced diameter portion of the projection 122 by means of a spring 125 to prevent the tool 141 from dropping out of the tool holding pot. Under these conditions the pawls 118 are disengaged from the holding pot 116.

A groove or notch 126 is provided at the lower center of the holding pot 116 for receiving a shifter 128 which is secured to the piston rod 127A (see FIG. 7) of a cylinder 127 for moving the pot 116. As shown in FIG. 7, the shifter 128 is moved along guide rods 129 extending between frames 115A and 115E.

Figure 8:
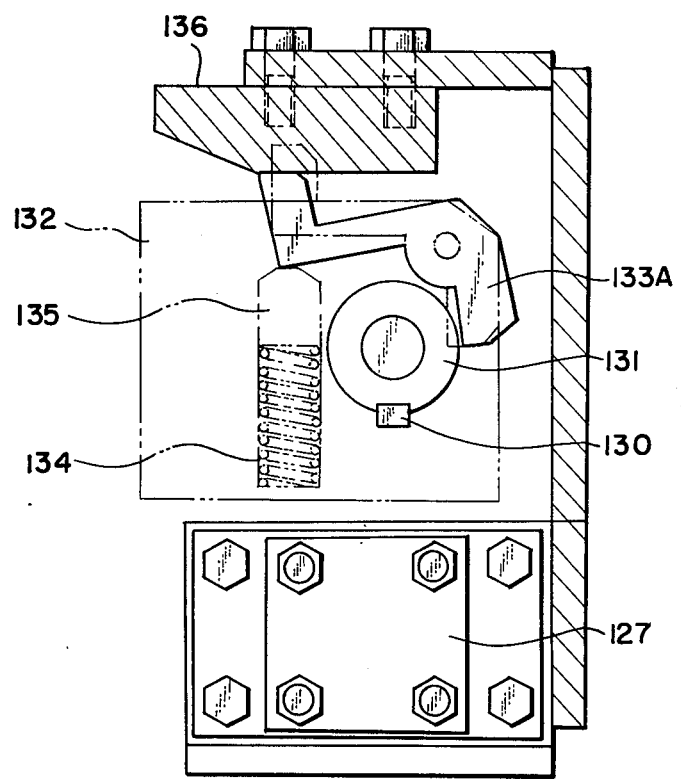
FIG. 8 is a righthand end view of FIG. 6.

Referring again to FIG. 6, a projection 131 having a key 130 is provided for the rear end of the holding pot 116 and a block 132 having an opening 132A for receiving projection 131 and a key way 133 for receiving key 130 is secured to the swing arm 119 shown in FIG. 5. As shown in FIGS. 6 and 8, a hook shaped lever 133A is rotatably mounted on block 132 and normally urged in the clockwise direction by a piston 135 pressed by a spring 134.

When the tool holding pot 116 is held in the position shown in FIG. 6, one end of the lever 133A engages a holding plate 136 (FIG. 8) secured to frame 115B. Under this condition the lever 133A is in the solid line position and does not engage holding pot 116. When the swing arm 119 is rotated to disengage the lever 133A from the holding plate 136, the lever 133A is rotated in the clockwise direction by spring 125 to a position shown by dot and dash lines. As will be described later, when the tool holding pot 116 is retracted to the right as viewed in FIG. 6, the lever 133A engages the reduced diameter portion of the projection 131 thereby holding the pot 116.

The tool exchanging mechanism operates as follows. During the tool exchanging operation, the tool holding pot 116 is received in the intermediate station 115 as shown in FIG. 6. Under these conditions, a tool 141 selected from the tool storage magazine device 113 is inserted into the pot 116. Then, a signal is produced by the tool transfer arm 114 and the piston rod 129 of cylinder 127 is moved to the right in response to this signal. Consequently, pot 116 is also moved to the right by shifter 128 so that the front flange 116A of the pot disengages frame 115A. The rear flange 116B also disengages the frame 115E and the projection 131 of the pot 116 is received in opening 132A. At this time, the holding pot 116 is prevented from rotating by key 130 and key way 133. The tool holding pot 116 is not moved over its full stroke by cylinder 127 as will be described later.

Then swing arm 119 is rotated 90° from the solid line position to the dot and dash line position shown in FIG. 5. As the swing arm 119 rotates, lever 133A supported thereby also rotates to disengage its upper end from holding plate 136 so that the lever 133A is rotated in the clockwise direction by spring 134, thus engaging the lower end of lever 133A against the reduced diameter portion of the projection 131. In this manner, the tool holding pot 116 is firmly held by shifter 128 during the rotation of the swing arm 119 and is moved to a predetermined position when the rotation of the swing arm 119 completes.

When the axis of the tool holding pot 116 is aligned with the axis of the spindle 112 of the machine tool, exchange of the tool is possible. While a new tool is selected and transferred, column 111 is retracted to await the new tool. Meanwhile the new tool is mounted on the spindle 112 and the old tool thereon is transferred to the pot by the tool exchanging arm 117. Then, when the swing arm 119 is returned to the original position shown by solid lines in FIG. 5 the lever 133A is rotated in the counterclockwise direction to the solid line position shown in FIG. 8 thus releasing the pot 116 from lever 133A. At this time, cylinder 127 is operated to move the pot 116 to the original position shown by solid lines in FIG. 6, and the old tool in the pot is returned to the tool storage magazine by the tool transfer arm 114.

We claim:

1. A tool storage magazine device comprising concentric inner and outer annular magazins, each provided with a plurality of tool pots and a blind pot which are arranged on a circle, magazine driving means for independently rotating said inner and outer annular magazines to bring a tool pot containing a designated tool or said blind pot to predetermined tool pot indexing positions, a tool holding pot disposed on the outside of said outer annular magazine for temporarily holding a tool, said tool holding pot having a center on a line interconnecting the center of said inner and outer annular magazines and the tool pot indexing positions thereof, a saddle located near said center and supported to be movable in a direction perpendicular to the axis of said magazines, a tool transfer arm supported by said saddle to be movable along said line interconnecting said tool pot indexing positions, said tool transfer arm including a gripper for gripping a tool, and means for selectively positioning said gripper to a retracted position inside of said inner magazine, the tool indexing positions of said inner and outer annular magazines and to the position of said tool holding pot.

2. The tool storage magazine device according to claim 1 wherein said inner and outer annular magazines are rotatably supported by a plurality of pairs of stationary rollers which engage the inner and outer peripheries of said inner and outer magazines respectively.

3. The tool storage magazine device according to claim 1 wherein said magazine driving means comprises gears secured to the inner periphery of said inner magazine and to the outer periphery of said outer magazine and power driven pinions respectively meshing said gears.

4. The tool storage magazine device according to claim 1 wherein said gripper positioning means comprises a plurality of stop means carried by said saddle at positions corresponding to said retracted position, said tool indexing positions, and the position of said tool holding pot respectively, a plurality of stop shafts, and means for selectively engaging said stop shafts against said stop means.

5. The tool storage magazine device according to claim 1 which further comprises means for moving said gripper in a direction perpendicular to the direction of movement of said saddle.

* * * * *